Aug. 27, 1968   O. BRAUN   3,398,921

COMPOSITE MOLDING

Filed Nov. 1, 1966   3 Sheets-Sheet 1

Inventor:
Oscar Braun
by Michael J. Striker
Attorney

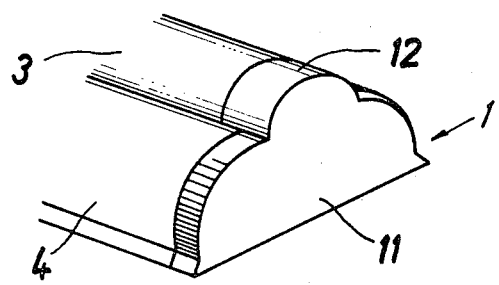
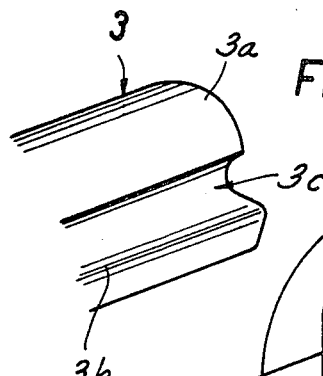
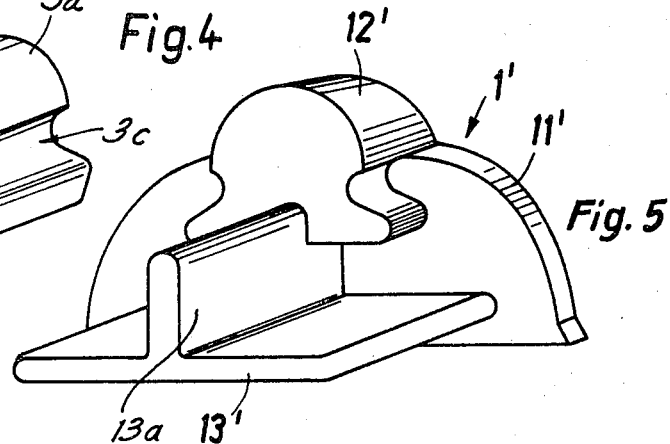
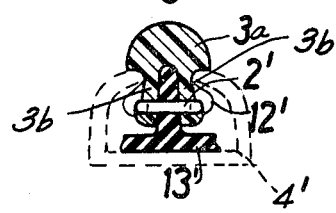
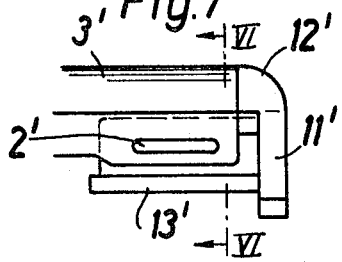

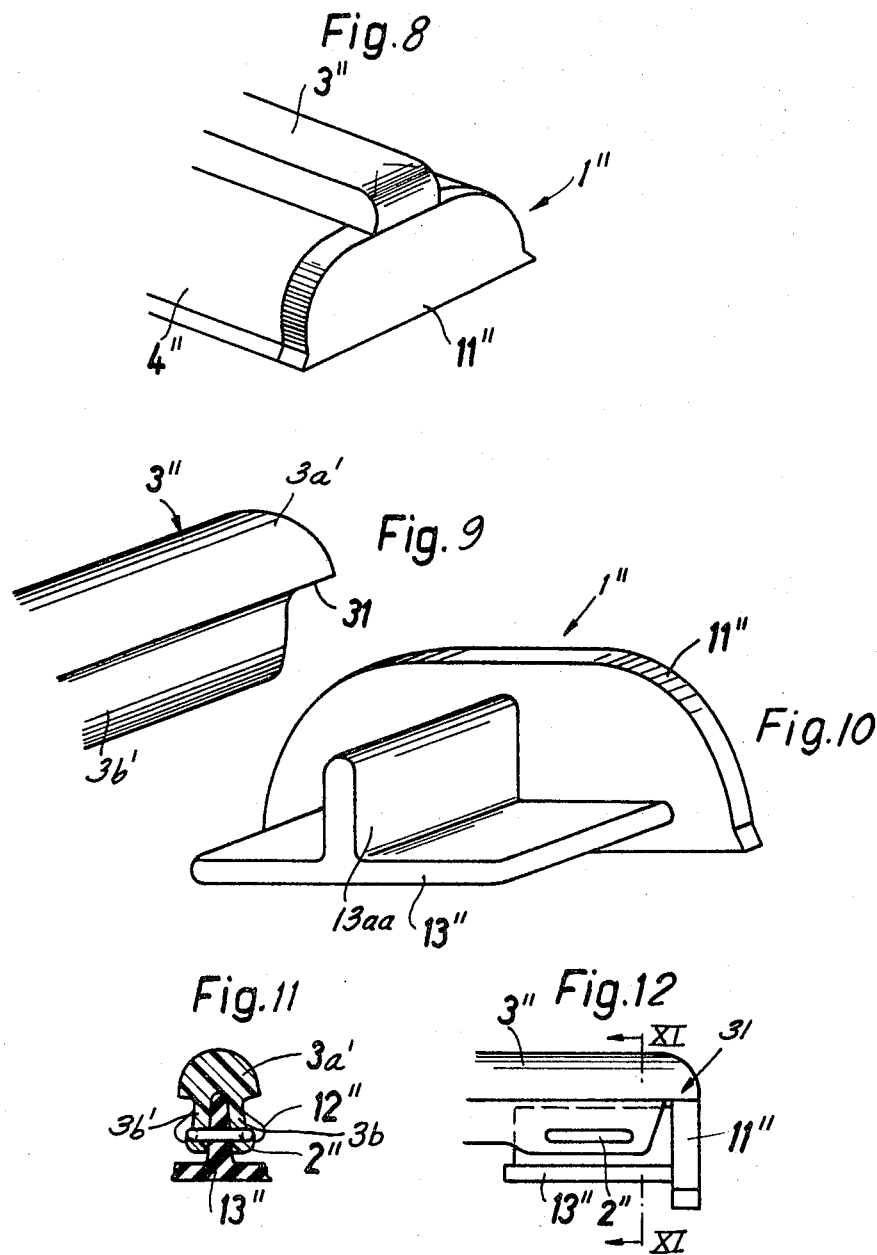

United States Patent Office 3,398,921
Patented Aug. 27, 1968

3,398,921
COMPOSITE MOLDING
Oscar Braun, Esslingen (Neckar), Germany, assignor to Pebra G.m.b.H., Paul Braun, Esslingen (Neckar), Germany
Filed Nov. 1, 1966, Ser. No. 591,354
Claims priority, application Germany, Nov. 5, 1965, P 26,213
12 Claims. (Cl. 248—345.1)

ABSTRACT OF THE DISCLOSURE

A composite molding strip comprises a rigid elongated hollow rail having a face which is provided with a longitudinally extending slot. An elongated liner has a base received in the slot, a ridge of resilient material which projects beyond the base, and an end portion. An end cap is located adjacent to one end of the rail and includes a projection which extends to this one end and engages the end portion of the liner. A staple comprises arms which respectively pierce the projection and the base for connecting the former with the latter.

---

The present invention relates to a composite molding strip. More specifically, it relates to a molding strip which may be utilized as a decoration on frames of automotive vehicles or the like. Still more specifically, the invention relates to a decorative strip of the type wherein a rigid base or rail carries a protective insert or liner of shock-absorbent material and is provided with end caps which close off the open ends of the rigid rail, such end caps being secured to the protective insert by mechanical means and in a manner which makes this means invisible to a person viewing the strip.

It is customary to decorate various aritcles, for instance furniture and more particularly, the frame of an automotive vehicle with molding strips. Such strips usually comprise rails of chromium-plated metallic material which are permanently or detachably secured to the frame. It is a frequent occurrence that such strips are nicked or dented, for instance if a vehicle in question is parked and the door of an adjacent vehicle is opened carelessly so that the door edge hits the rail. It is therefore becoming an increasingly popular practice to provide such rails with protective inserts or liners which extend beyond the front face of the rail and consist of rubber or a suitable elastomeric plastic material capable of taking up at least some shock, to thereby protect the metallic material of the rail from nicks, dents and other damage. The liners are anchored so that they cannot move in directions at right angles to the front face of the respective rail, but they do tend to expand or contract and the extent of such changes in length is considerable because the strips are normally quite long. It is therefore necessary to prevent such highly undesirable changes in length and it has been proposed to provide end caps to which the ends of the liners can be secured. Such end caps serve a dual purpose in that they close off the open ends of the rigid rails, thus enhancing the appearance of the same and in that, with the ends of the liners secured to the end caps and the end caps in turn engaging the rails, the liners are prevented from contraction. However, these prior proposals are rather unsatisfactory, either because the hooks or barbs used for securing the ends of the liners to the end caps are visible and create an aesthetically displeasing appearance, or because the various bonding agents used in lieu of such hooks or barbs are not strong enough to withstand the sometimes considerable contractile movements of the liners.

Accordingly, it is a general object of the present invention to overcome the disadvantages of the prior art.

A more specific object of the present invention is to provide a decorative strip for automobile frames and the like, wherein the shock-absorbent liners are secured to their rails in a very simple but highly reliable manner so that they cannot undergo any shrinkage.

Another object of the invention is to provide improved closures or end caps for a decorative composite molding strip of the characteristics outlined above.

An additional object of the invention is to provide an improved connection between the end caps and the remaining component parts of a composite molding strip.

A concomitant object of the invention is to provide a composite molding strip wherein the end caps may be secured to the rail and to the shock-absorbent liner by mechanical means but in a manner in which the mechanical means utilized are rendered invisible to the eye of a person viewing the composite strip.

Still a further object of the invention is to provide a composite molding strip of the type outlined above which can be produced in any desired size, wherein the liner may be permanently connected with the end caps without affecting the appearance and/or the strength characteristics of the remaining parts of the strip, and wherein such connections may be provided by resorting to readily available tools or machines.

In accordance with one feature of my invention I provide a composite molding strip which comprises a rigid elongated hollow rail having a face provided with a longitudinally extending groove. The composite strip further comprises an elongated liner having an end portion, a base which is received in the groove of the hollow rail, and a ridge of resilient material which projects beyond the face of the hollow rail so as to be capable of absorbing shocks. An end cap is provided adjacent to one end of the rail and includes a projection which extends into the end and engages the end portion of the elongated liner within the rail. Finally, I provide a connecting member which connects the projection to the base within the rail so that the elongated liner is thereby prevented from longitudinal contraction while the end cap simultaneously closes off the open end of the rail.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a partial perspective view of a composite molding strip in accordance with the present invention;

FIG. 4 is a perspective view of an end portion of the liner;

FIG. 5 is a perspective view of another embodiment of an end cap for use in a composite molding strip according to the present invention;

FIG. 6 is a section taken on the line VI—VI of FIG. 7;

FIG. 7 is a side-elevation of the embodiment shown in FIG. 3, but with the rail 4 removed;

FIG. 8 is a view similar to FIG. 3, but showing another embodiment of the invention;

FIG. 9 is a view similar to FIG. 4 but showing a modified liner for use in the embodiment of FIG. 8;

FIG. 10 is a view similar to FIG. 5, but showing the end cap for use with the embodiment of FIG. 8;

FIG. 11 is a section taken on the line XI—XI of FIG. 12; and

FIG. 12 is a view similar to FIG. 7, but showing the embodiment of FIG. 8.

Figure 1:
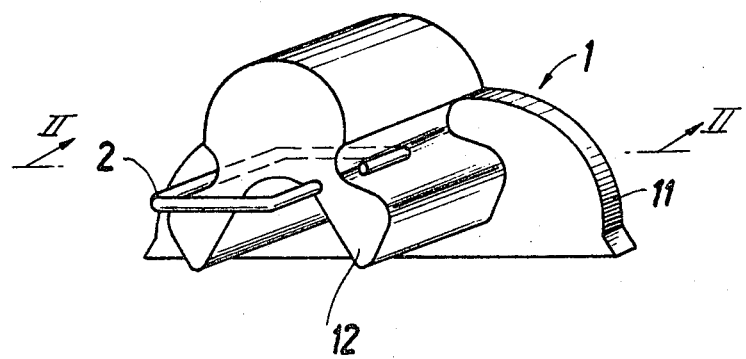
FIG. 1 is a perspective view of an end cap for use with a strip in accordance with the present invention.
Figure 2:
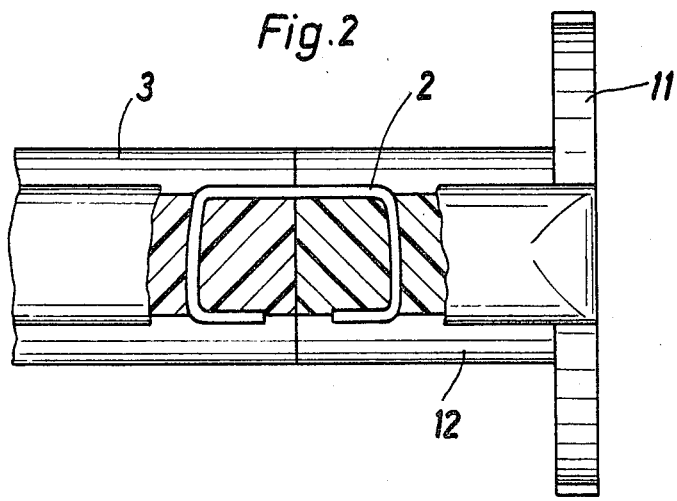
FIG. 2 shows the end cap of FIG. 1 secured to a liner in a partial sectional view taken along the line II—II of FIG. 1.

Discussing now the drawing in detail, and firstly the embodiment of the invention which is shown FIGS. 1 and 2, it will be seen that reference numeral 3 indicates an elongated liner (FIG. 2) of elastomeric material. An end cap for the composite molding strip is indicated with reference numeral 1 and consists of what might be termed a head 11 and a projection 12 extending at right angles to the general plane of the head 11. The cross-sectional configuration of the projection 12 corresponds to that of the liner 3. The rigid rail to be protected by the liner 3 is not shown in FIGS. 1 and 2 to enhance the clarity of the illustrations; however, FIG. 3 shows how the rigid rail 4 is provided to complete the composite molding strip in accordance with the present invention. It should be noted that the external appearance of the strip shown in FIG. 3 is applicable both to the embodiments of FIGS. 1 and 2 and of FIGS. 4–7.

As further shown in FIGS. 1 and 2 a staple 2, which may consist of wire or a similar suitable material, extends through the projection 12 as well as through the liner 3 and thus secures the two members to one another. The free end face of the projection 12 abuts, as is evident from FIG. 2, against the free end face of the liner 3. It is to be noted that both the projection 12 and the liner 3 are provided with lateral depressions extending in their respective longitudinal direction, and that the staple 2 pierces both members within such lateral depressions. Since these lateral depressions are located inwardly of the peripheral edge of the head 11, and since further the rail 4, as shown in FIG. 3, has a cross-sectional configuration corresponding to that of the head 11, the staple 2 is concealed from view once the rail 4 is installed. Furthermore, and as is also evident from FIG. 3, the head 11 engages the ends of the rail 4 and is thus prevented from longitudinal movement should the liner 3, secured to the projection 12 of the end cap 1, tend to contract. This, obviously, eliminates such undesired contraction.

Coming now to the embodiment shown in FIGS. 3–7 it is to be noted that the end cap 1 has a configuration somewhat different from that shown in FIG. 1. The end cap for use in the embodiment of FIGS. 3–7 is illustrated in FIG. 5 and it will be seen that in addition to the head 11', and the projection 12', both of which are substantially the same as in the embodiment of FIG. 1, there is additionally provided a second projection in form of an inverted T. This second projection, which extends beyond the free end face of the projection 12', comprises a transverse web 13' and an upright web 13a which rises from the former.

The perspective appearance of the liner 3' is shown in FIG. 4 and it will be seen that the liner consists of an upper portion or ridge 3a and a lower portion or base 3b. At the juncture of the ridge 3a with the base 3b there is provided a longitudinally extending depression 3c on each side of the liner 3' (only one shown). The cross-sectional configuration of liner 3' is best evident in FIG. 6, which is a section taken on the line VI—VI of FIG. 7, and from which it is evident that the base 3b of the liner is bifurcated in longitudinal direction and that an end portion of the liner is placed onto the second projection of the end cap in such a manner that the bifurcation straddles the upright web 13a. The staple 2' extends through the web 13a and through the two legs formed by the bifurcation, as is evident from FIGS. 6 and 7. Since the web 13a terminates downwardly of the ridge 3a of liner 3', and consequently downwardly of the corresponding part of portion 12' of the end cap, the staple 2' which is of course again located in the longitudinally extending depressions 3c, is concealed from view when the rigid metallic rail 4' is assembled to the thus-joined liner 3' and end cap 1'. For purposes of better understanding, the rail 4' has not been shown in full lines in FIG. 6, but has been indicated only in dashed lines and it will be seen that it extends upwardly above the staple 2' which is thus concealed. In FIG. 7 the rail 4' has been entirely omitted for the sake of greater clarity. It is to be noted that in the embodiment of FIGS. 3–7 the width of grooves 3c is somewhat greater than in the embodiment of FIGS. 1 and 2 so that, as is evident from FIGS. 6 and 7, the staple 2' can be provided at a point which is somewhat lower than that shown in the embodiment of FIGS. 1 and 2.

Coming, finally, to the embodiment shown in FIGS. 8 to 12 it will be seen that this is different from that of FIGS. 3–7 mainly in the provision of a different end cap 1". In the end cap used in the embodiment of FIGS. 8–12 the projection 12" has been eliminated, as is evident from FIG. 10. Only the projection in form of an invert T with its transverse web 13" and its upright web 13aa is provided. To compensate for the elimination of the projection 12" the ridge 3a' of liner 3" is provided with a portion 31 which extends in longitudinal direction of liner 3" beyond the base 3b' thereof. The projection 31 is in this embodiment of such length that its free end face is flush with the exterior end face of the head 11" and consequently, as is evident from FIGS. 8, 11 and 12, the projection 31 overlies a corresponding portion of the edge face on the head 11". In other respects this embodi- is similar to that of FIGS. 3–7 in that the bifurcated base 3b' of liner 3" again straddles the upright web 13aa of end cap 1". The staple 2" is also provided in the same manner as shown in FIGS. 3–7 for securing the end cap to the liner 3". The rail 4", which is shown in FIG. 8, has been omitted from FIGS. 11 and 12 for purposes of clarity but it will be evident that, similarly as in the view shown in FIG. 6, the rail, 4" will conceal the staple 3" from view. As compared to FIGS. 3–7, the embodiment of FIGS. 8–12 provides for the end portion of the ridge 3a' of liner 3" somewhat more freedom of movement relative to the end cap 11" in the sense that, if the ridge 3a' which has been previously identified as consisting of such elastomeric material as rubber or plastic, is deflected in a direction transversely to the elongation of the composite molding strip by engagement with an obstruction, such deflection can take place with less danger of the liner 3" tearing loose from the end cap 1" than if this end portion of ridge 3a' were in tight abutment with a projection 12 rigidly provided on the end cap 1".

Of course it will be understood that the rail 4 may consist of metallic or rigid plastic material. For instance, the rail 4 may consist of steel coated with a layer of chromium or nickel, or it may consist of a suitable plastic material on which a layer of metal is deposited by one of the well-known processes. Again, such plastic material could of course be utilized without being "metallized" if this should be desired. Liner 3 may, as pointed out earlier, consist of rubber or a synthetic plastic material, for instance a thermoplastic material, and this is also true of the end cap 1. Naturally, composite molding strips of this type may be utilized for many different applications, not only in automotive vehicles but on furniture, watercraft, aircraft, other types of conveyances, and the like. The rail may be produced by an extrusion process, by stamping or by rolling, depending on the nature of the material and the availability of machinery at the manufacturing plant, and it is only to be assured that the rail is of such cross-sectional configuration as to conceal the staple 2, and of course the inwardly extending projections of end cap 1, when it is in place.

It will also be evident that, whereas only one cap has been shown, each composite molding strip will normally comprise two such end caps 1 although applications with only one end cap are not to be excluded. The term "staple," which has been employed herein for the connecting means, is not to denote any limitations and has been used only for the sake of convenience.

It will be understood that each of the elements described above, or two or more together, may also find a useful application in other types of moldings differing from the types described above.

While the invention has been illustrated and described as embodied in a composite molding strip, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essenial characteristics of the generic or specific aspects of this invention and, therefore, such adaptations should and are intended to be comprehended within the meaning and range of equivalence of the following claims.

What is claimed as new and desired to be secured by Letters Patent is:

1. As a novel article of manufacture, a composite molding strip comprising, in combination, a rigid elongated hollow rail having a face provided with a longitudinally extending slot; an elongated liner having an end portion, a base received in said slot, and a ridge of resilient material projecting beyond said face; an end cap adjacent to one end of said rail and including a projection extending into said one end engaging said end portion therewithin; and a connection member comprising arms which respectively pierce said projection and said base for connecting the former within the latter within said rail.

2. An article as defined in claim 1, wherein said end cap comprises a portion extending normal to the elongation of said rail.

3. An article as defined in claim 2, wherein said projection has a cross-sectional contour corresponding to that of said liner.

4. An article as defined in claim 1, wherein said projection comprises a first portion having a cross-sectional contour corresponding to that of said ridge, and a second portion arranged to engage said base of said liner.

5. An article as defined in claim 1, wherein said base of said liner is provided at least in the region of said end portion with a recess extending toward said ridge; and wherein said projection comprises a portion extending into said recess.

6. An article as defined in claim 1, wherein said base of said liner is provided at least in the region of said end portion with a recess extending toward said ridge; and wherein said projection is of substantially T-shaped configuration having a cross-web and an upright web with the cross-web being located below said base and the upright web being received in said recess, said connecting member connecting said upright web to said base.

7. An article as defined in claim 4, wherein said base of said liner is provided at least in the region of said end portion with a recess extending toward said ridge, and wherein said second portion of said projection is received in said recess.

8. An article as defined in claim 2, wherein said ridge of said liner comprises a portion extending longitudinally beyond said base.

9. An article as defined in claim 8, wherein said portion of said ridge overlies said portion of said end cap.

10. An article as defined in claim 8, wherein said portion of said end cap has an outer end face facing away from said liner, and wherein the free end of said portion of the ridge is flush with said outer end face.

11. An article as defined in claim 1, wherein said connecting member is of substantially C-shaped configuration.

12. An article as defined in claim 10, wherein said base is provided on opposite sides at its juncture with said ridge and at least in the region of said end portion with longitudinally extending depressions, said connecting member piercing said base in said depressions with said arms of the connecting member being located in one and the remainder being located in the other depression.

References Cited

UNITED STATES PATENTS 3,290,082   12/1966   Fritsch _____ 293—1

JOHN PETO, *Primary Examiner.*